United States Patent [19]
Parente et al.

[11] Patent Number: 5,151,311
[45] Date of Patent: Sep. 29, 1992

[54] ACOUSTIC ATTENUATING LINER AND METHOD OF MAKING SAME

[75] Inventors: Charles A. Parente, Oyster Bay; Sonya J. Westerback, North Bellmore, both of N.Y.

[73] Assignee: Grumman Aerospace Corporation, Bethpage, N.Y.

[21] Appl. No.: 611,633

[22] Filed: Nov. 13, 1990

Related U.S. Application Data

[63] Continuation-in-part of Ser. No. 407,858, Sep. 15, 1989, abandoned, which is a continuation-in-part of Ser. No. 115,481, Nov. 2, 1987, abandoned.

[51] Int. Cl.$^5$ ................................................ B32B 3/12
[52] U.S. Cl. ...................................... 428/116; 52/806; 181/292; 428/138
[58] Field of Search ............... 428/116, 138; 156/197, 156/292; 52/806; 181/292

[56] References Cited

U.S. PATENT DOCUMENTS

| | | | |
|---|---|---|---|
| 3,502,171 | 3/1970 | Cowan | 428/116 X |
| 3,690,606 | 9/1972 | Pall | 428/116 X |
| 4,090,002 | 5/1978 | Rosenblum | 428/116 X |
| 4,304,376 | 12/1981 | Hilton | 428/116 X |
| 4,350,551 | 9/1982 | Michaelson | 428/116 X |
| 4,433,021 | 2/1984 | Riel | 428/116 |
| 4,567,076 | 1/1986 | Therrien | 428/116 X |
| 4,833,029 | 5/1989 | DuPont et al. | 428/116 |

Primary Examiner—Henry F. Epstein
Attorney, Agent, or Firm—Richard G. Geib; Daniel J. Tick

[57] ABSTRACT

An acoustic attenuating liner has a non-metallic honeycomb core bonded on a backsheet. A corrosion-insulated perforated sheet is bonded to the honeycomb core by adhesive between the perforated sheet and the core. A mesh woven form corrosion-resistant metal is bonded to the perforated sheet by additional adhesive between the mesh and the perforated sheet for bonding said mesh to said perforated sheet. The additional adhesive has predetermined characteristics including a minimum viscosity of 1000 poises during curing.

8 Claims, 1 Drawing Sheet

ACOUSTIC ATTENUATING LINER AND METHOD OF MAKING SAME

This is a continuation-in-part of application Ser. No. 407,858, filed Sep. 15, 1989, abandoned, which, in turn, is a continuation-in-part of application Ser. No. 115,481, filed Nov. 2, 1987, abandoned, for Acoustic Attenuating Liner and Method of Making Same.

BACKGROUND OF THE INVENTION

The present invention relates to an acoustic attenuating liner. More particularly, the invention relates to an acoustic attenuating liner and a method of making such liner.

There is a great need for lightweight, durable, corrosion-resistant acoustic attenuators for aircraft in order to reduce noise pollution caused by jet engines.

The principal object of the invention is to provide an acoustic attenuating liner of simple structure which functions efficiently, effectively and reliably to reduce the noise of a jet engine.

An object of the invention is to provide an acoustic attenuating liner which is lightweight, durable and corrosion-resistant.

Another object of the invention is to provide an acoustic attenuating liner which is suitable for use with all types of aircraft and engines.

BRIEF SUMMARY OF THE INVENTION

In accordance with the invention, an acoustic attenuating liner comprises a backsheet. A corrosion-resistant honeycomb core is provided on the backsheet and bonded thereto. A corrosion-insulated perforated sheet is provided on the honeycomb core. An adhesive is provided between the perforated sheet and the core for bonding the perforated sheet to the core. A mesh woven to a determined weave pattern from a corrosion-resistant metal is placed on the perforated sheet. The perforated sheet is reticulated. An additional adhesive is provided between the mesh and the perforated sheet for bonding the mesh to the perforated sheet. The additional adhesive has predetermined characteristics including a minimum viscosity of 1000 poises during curing and a predetermined thickness.

In one embodiment of the invention, the backsheet comprises aluminum, the perforated sheet comprises anodized aluminum, the mesh comprises corrosion-resistant stainless steel wire and the honeycomb core comprises aluminum.

In another embodiment of the invention, the honeycomb core comprises non-metallic material and the perforated sheet comprises a graphite epoxy open weave woven to a determined open area with the weave cross-section flattened to provide a bonding surface and smooth aerodynamics.

In accordance with the invention, a method of making an acoustic attenuating liner, comprises the steps of weaving a perforated sheet of composite material, impregnating the perforated sheet of composite material with a resin, curing the perforated sheet of composite material with heat and pressure, forming a honeycomb core of composite material, reticulating the perforated sheet with an epoxy reticulating adhesive comprising a precatalyzed epoxy adhesive in film form which may be applied to the perforated sheet by reticulative process and curing with heat and pressure to bond the perforated sheet of composite material to the core, forming a backsheet of composite material, bonding the core to the backsheet with an epoxy supported film adhesive and curing with heat and pressure, weaving a mesh of corrosion-resistant material having acoustic properties which meet desired acoustic resistance values, spraying the perforated sheet with an epoxy adhesive to a thickness of substantially 1.0 to 1.5 mils, staging the epoxy adhesive on the perforated sheet to ensure a minimum viscosity of 1000 poises during subsequent curing and bonding the mesh to the perforated sheet and curing with heat and pressure.

The mesh is woven in a reverse plain dutch weave pattern, the perforated sheet comprises a graphite epoxy open weave woven to a determined open area with the weave having a low profile so as to improve the bonding footprint and provide good aerodynamics and the backsheet comprises a graphite epoxy structural laminate.

The perforated sheet, the epoxy reticulating adhesive, the bonding of the mesh to the perforated sheet and the bonding of the core to the backsheet are cured at substantially 10 to 45 psi pressure at a temperature of substantially 330° to 350° F. This sequence results in a face sheet with a low profile which is smooth and does not induce aerodynamic drag in the engine which would reduce engine performance. The epoxy reticulating adhesive is a precatalyzed epoxy adhesive in film form which may be applied by reticulative process, such as, for example, Hysol EA9649 or EA9689, which consist of epoxy resin of trifunctional aromatic glycidyl ether and epoxidized novolac and a curvature of 4,4'-diaminodiphenyl sulfone.

The perforated sheet is sprayed with Minnesota Mining and Manufacturing EC3710 which consists of epoxy resin of a mixture of diglycidy ethers of Bisphenol "A", epoxy novolacs and multifunctional epoxy resins and a curative of 4,4'-diaminodiphenylsulfone/dicyandiamide.

The core is bonded to the backsheet with a film adhesive which may be a precatalyzed epoxy adhesive in film which may be applied by reticulative process, such as, for example, Hysol EA9649.

In accordance with the invention, a method of making an acoustic attenuating liner for an engine cowling comprises the steps of weaving graphite to form a perforated sheet of composite material, prepregging the graphite with an epoxy resin, curing the prepregged graphite into a desired configuration at a temperature of substantially 340° F. and a pressure of substantially 45 psi, applying the epoxy reticulating adhesive to the surface of an open weave of the perforated sheet in a manner whereby the holes are left open, placing a honeycomb core of non-metallic material on the surface of the open weave having the adhesive, placing a graphite reinforced composite backsheet on the opposite side of the honeycomb, bonding the backsheet, core and perforated sheet and curing at a temperature of substantially 340° F. and a pressure of substantially 45 psi, spraying the open weave with an epoxy adhesive on its opposite surface to a thickness of substantially 1.0 to 1.5 mils whereby the peel strength is adequate and the mesh remains unblocked, staging the perforated sheet in an oven, adding a stainless steel mesh to the epoxy adhesive on the opposite surface of the open weave, and bonding the mesh to the perforated sheet and curing at a temperature of substantially 340° F. and a pressure of substantially 45 psi.

The backsheet, core and perforated sheet are staged for substantially one hour at substantially 210° F.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
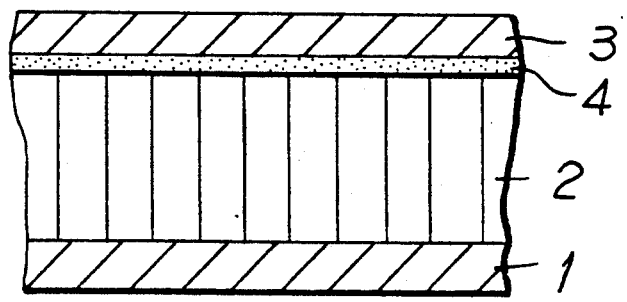
FIG. 1 is a cross-sectional view of a first embodiment of the acoustic attenuating liner of the invention.

The first embodiment of the acoustic attenuating liner of the invention, as shown in FIG. 1, comprises a backsheet 1 of solid aluminum. A corrosion-resistant aluminum honeycomb core 2 of any suitable known type such as, for example, the PAA (Reg. Trademark) core of American Cyanamid, is placed on the backsheet 1, which is preferably aluminum, and bonded thereto. The core 2 is further protected against corrosion by dip priming in corrosion-inhibiting adhesive primer, such as, for example, Hysol EA9205 primer, which consists of a trifunctional aromatic glycidyl ether and epoxidized novolac epoxy resin cured with a 4,4'-diaminodiphenylsulfone/dicyandiamide filled with strontium chromate, all dissolved or suspended in methyl ethyl ketone solvent to provide a sprayable solution. A corrosion-insulated perforated sheet 3 of any suitable known type is provided on the honeycomb core 2. The perforated sheet 3 is preferably corrosion-insulated by anodizing the aluminum sheet coupled with the use of a corrosion-inhibiting adhesive primer, such as, for example, Hysol EA9205 primer.

The perforated sheet 3 preferably has a per cent open area ranging from 27 to 35% of its surface. The selected opening percentage is preferably uniform over the entire surface area of the perforated sheet 3.

Adhesive 4 of a type capable of reticulation is placed between the perforated sheet 3 and the honeycomb core 2 for bonding said perforated sheet to said core. This adhesive is reticulated on the perforated skin to eliminate adhesive blockage of the perforated holes. The only blockage that results is at the intersection of the perforate. Standard reticulation methods result in reticulation of the honeycomb core and the inherent blockage of many holes which will result in decreased acoustic performance of the line. This "reverse reticulation" is accomplished by using a reticulation system designed to move the perforated skin across an air knife at a predetermined rate and air temperature and flow rate. The air knife is designed to fit the contour of the part such that the reticulation adhesive forms uniformly around the holes. The reticulation is performed on the perforated sheet 3 in order to prevent blockage of the holes.

Figure 2:
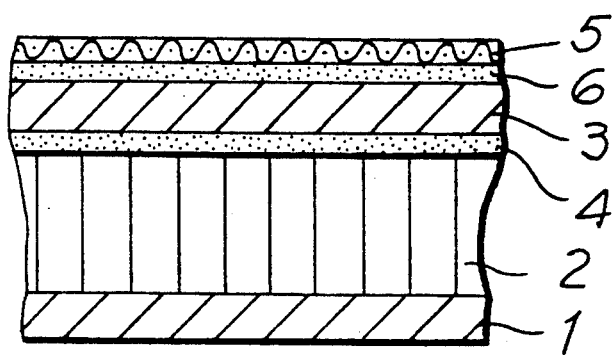
FIG. 2 is a cross-sectional view of a second embodiment of the acoustic attenuating liner of the invention.

The second embodiment of the acoustic attenuating liner of the invention, as shown in FIG. 2, has the same backsheet 1, honeycomb core 2 and perforated sheet 3 as the first embodiment. The perforated sheet 3 of the second embodiment is preferably corrosion-insulated by anodizing the aluminum sheet in sulfuric acid, followed by priming with a corrosion-inhibiting adhesive primer, such as, for example, Hysol EA9205 primer. Another key to improving the acoustic performance is reducing the thickness of the perforate sheet and maintaining the hole size and spacing. A thin skin with a large open area of 27 to 35%, along with the proper wire mesh will result in a liner which has a low mass reatance factor and low non-linearity factor. In addition, in the second embodiment, a mesh 5 woven from corrosion-resistant metal is placed on the perforated sheet 3. The mesh 5 preferably comprises a stainless steel which has been woven from an alloy which has not been drawn in fine wires prior to this and to a weave pattern which has been shown to yield uniformly repeatable acoustic properties, low non-linearity factors and low mass reactance factors. Low non-linearity factors result in liners that are not sensitive to air flow. Grazing flow over the liner surface modifies the liner's orifice discharge coefficient. Low mass reactance factors of liners has been demonstrated to improve the acoustic properties. The particular woven mesh pattern can be altered during the weaving process by removing or adding wires in the warp direction. Although the mesh 5 may comprise any suitable known corrosion-resistant wire, a preferred wire alloy is that known as 254SMO produced by Avesta of Sweden and is woven in a reverse plain Dutch weave pattern to meet specific flow resistance values. The drawing of thin strands of wire from the alloy 254SMO and weaving this wire into a particular weave for the face skin has a two-fold purpose. The first is for corrosion resistance and the second is for improved acoustic performance. A tightly woven mesh having 700 to 755 strands in the warp direction and 130 and 155 strands in the fill direction is selected because it exhibits excellent flow resistance properties. These properties include low non-linearity factors which aid in yielding good acoustic properties of the bondment. The acoustic properties may be adjusted by removing or adding strands in the warp direction.

In the second embodiment of the invention, an additional adhesive 6 is placed between the mesh 5 and the perforated sheet 3 to bond said mesh to said perforated sheet. The additional adhesive 6 is selected especially, because it has predetermined characteristics, including a minimum viscosity of 1000 poises during subsequent curing. More particularly, the additional adhesive is preferably a precatalyzed epoxy adhesive in solution form, suitable for application by spray technique, such as, for example, that manufactured by the Minnesota Mining and Manufacturing Company and known as EC3710. The adhesive spray thickness must fall within a designed thickness in order to meet the acoustic requirements, not become blocked, and also have sufficient peel strength to prevent delamination in service. The adhesive spray is applied by robot to a set pattern which will apply a uniform coating in addition to an adhesive of predetermined thickness. When it is used to join metals, the adhesive 6 is substantially 0.6 to 0.9 mil in thickness and when it is used to join graphite composites, the adhesive 6 is substantially 1.0 to 1.5 mils in thickness. The additional adhesive is sprayed on by a robot, so that a calculated amount of adhesive thickness is applied to the perforated surface which will provide the correct amount of peel strength and no blockage of the woven wire mesh.

Figure 3:
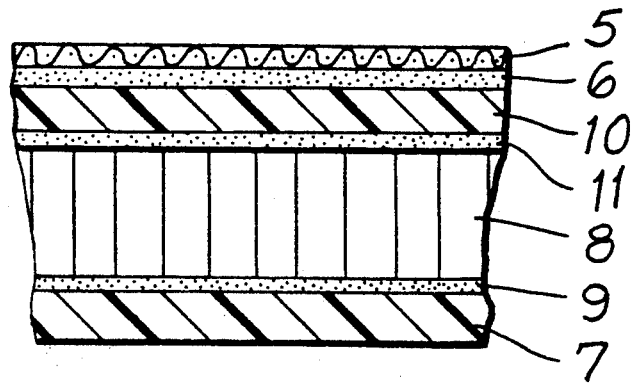
FIG. 3 is a cross-sectional view of a third embodiment of the acoustic attenuating liner of the invention.

The third embodiment of the acoustic attenuating liner of the invention, shown in FIG. 3, comprises a backsheet 7 of solid composite material of any suitable type, preferably reinforced graphite. A honeycomb core 8 of non-metallic material, such as, for, example, composite material, such as, for example, Nomex ™ is bonded to the backsheet 7 with adhesive 9 of any suitable known type. The key to this part of the structure is the reticulating adhesive. The normal acoustic liners have the reticulating adhesive applied to the honeycomb core, which results in blockage of many holes on the perforated skin during the bonding. This blockage results in reduced acoustic performance. Instead, a method has been devised whereby the reticulating adhesive is applied on the perforated skin. This is accomplished by utilizing a reticulating system which controls the temperature, airflow rate and sweep time of the perforate over the air knife. The resulting skin has no blocked holes, so that when it is combined with the other components results in an improved liner.

In the third embodiment of the invention, a perforated sheet 10 (FIG. 3) of graphite yarn woven in an open weave and impregnated with epoxy is bonded to the honeycomb core 8 with adhesive 11 of a reticulating type and applied to the open surface by a reticulation process. The open weave material is woven to provide an open area of consistent percentage. This material is woven such that the tows of the graphite weave leave a low profile. This is accomplished by dividing the number of graphite strands into smaller bundles during the weaving process. A low profile perforated skin results which accomplishes two important tasks. The first is that the low profile provides a wider footprint for bonding the wire mesh and provides greater peel strength. The second is that the low profile of the cured perforate is an improved aerodynamic surface which is required for both engine and acoustic performance. The percent open area may be increased or decreased during the weaving thereof to account for changes in acoustic attenuation requirements. The stainless steel wire mesh 5 of the embodiment of FIG. 2 is bonded to the perforated sheet 10 by the additional adhesive 6 of the embodiment of FIG. 2. The additional adhesive 6 is controlled to provide good peel strength and low blockage for good acoustic performance.

The acoustic attenuating liner of the invention may be made for a jet engine inlet or bypass cowling. In the method of making an acoustic attenuating liner of the invention for an engine cowling, graphite is woven to form a perforated sheet. The graphite is then pre-pregged with epoxy resin and cured into a desired configuration, preferably of a portion of an engine cowling. Adhesive is reticulated onto the surface of an open weave, such that the open area remains the same, and a honeycomb core of non-metallic material is placed on the surface of the open weave having the adhesive. A solid graphite backsheet is placed on the opposite side of the honeycomb core from the open weave. The assembly of the backsheet, the honeycomb core and the perforated sheet is cured in a one-shot autoclave operation.

The open weave is sprayed with an additional adhesive, which is the same as the additional adhesive of the second and third embodiments of the invention, on its opposite surface. In the second and third embodiments of the invention, the assembly is staged in an oven at substantially 210° F. for substantially one hour.

A stainless steel mesh, which is the smae as the mesh of the second and third embodiments of the invention, is added to the additional adhesive on the opposite surface of the open weave. The additional adhesive is cured and the mesh is bonded to the previously bonded backsheet, honeycomb core and perforated sheet and all are bonded at a pressure of substantially 45 psi.

Although shown and described in what are believed to be the most practical and preferred embodiments, it is apparent that departures from the specific method and design described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. An acoustic attenuating liner, comprising
   a backsheet;
   a honeycomb core on said backsheet and bonded thereto, said honeycomb core being coated with a corrosion-inhibiting adhesive primer;
   a perforated sheet on said honeycomb core, said perforated sheet being coated with said corrosion-inhibiting adhesive primer and having a percent open area ranging from 27 to 35% of its surface and a maximum thickness of 0.025 inch for good mass reactance;
   adhesive between said perforated sheet and said core for bonding said perforated sheet to said core;
   a mesh woven to a determined weave pattern from corrosion-resistant metal on said perforated sheet, said perforated sheet being reticulated; and
   additional adhesive between said mesh and said perforated sheet for bonding said mesh to said perforated sheet, said additional adhesive having predetermined characteristics including a minimum viscosity of 1000 poises during curing and a predetermined thickness.

2. An acoustic attenuating liner as claimed in claim 1, wherein said backsheet comprises aluminum.

3. An acoustic attenuating liner as claimed in claim 1, wherein said perforated sheet comprises anodized aluminum.

4. An acoustic attenuating liner as claimed in claim 1, wherein said mesh comprises stainless steel wire.

5. An acoustic attenuating liner as claimed in claim 1, wherein said honeycomb core comprises aluminum.

6. An acoustic attenuating liner as claimed in claim 5, wherein said adhesive primer comprises a trifunctional aromatic glycidyl ether and epoxidized novolac epoxy resin cured with a 4,4'-diaminodiphenylsulfone/dicyandiamide filled with strontium chromate, dissolved in methyl ethyl ketone solvent.

7. An acoustic attenuating liner as claimed in claim 1, wherein said perforated sheet comprises a weave in a determined pattern which provides low non-linearity factors and which permits resistance changes for tuning the final resistance of said liner.

8. An acoustic attenuating linear as claimed in claim 7, wherein said perforated sheet comprises an open weave woven to a determined open area with the weave cross-section flattened to provide a bonding surface and smooth aerodynamics.

* * * * *